April 19, 1960 E. C. LEMMOND 2,933,186
PRODUCT LIFT ELEVATOR

Filed Dec. 23, 1955 2 Sheets-Sheet 1

INVENTOR
EVERETT C. LEMMOND
BY
ATTORNEYS

April 19, 1960  E. C. LEMMOND  2,933,186
PRODUCT LIFT ELEVATOR

Filed Dec. 23, 1955  2 Sheets-Sheet 2

INVENTOR
EVERETT C. LEMMOND
BY
ATTORNEYS

United States Patent Office 2,933,186
Patented Apr. 19, 1960

2,933,186

PRODUCT LIFT ELEVATOR

Everett C. Lemmond, Somerville, Ala.

Application December 23, 1955, Serial No. 554,985

7 Claims. (Cl. 209—248)

The present invention relates to the poultry industry and more particularly to emptying receptacles in which freshly-killed fowl are chilled in a vat with crushed ice and water, and it is necessary to separate the fowl from the ice and water after the chilling operation.

It has been the practice to chill freshly-killed poultry by placing the fowl in a vat of ice and water for a suitable length of time to assure quality to the consumer. The fowl must be separated from the water and ice for packing in boxes, freezing, storage or the like. The procedure of separating the fowl from the ice and water has been troublesome and expensive and also the workers found the task objectionable because of the mess involved.

It is an object of the present invention to overcome the above-described difficulties and to provide the simple and efficient apparatus for separating poultry from the ice and water.

Another object of the invention is to provide an apparatus for supporting and dumping the contents of the vats.

Another object of the invention is to provide means to separate small-sized objects from larger-sized objects without damage to the various objects and with a minimum of physical labor.

A further object is to provide apparatus for continuously supplying packers with produce to be packed without involving any delay to obtain the greatest efficiency of the workers.

Figure 1:
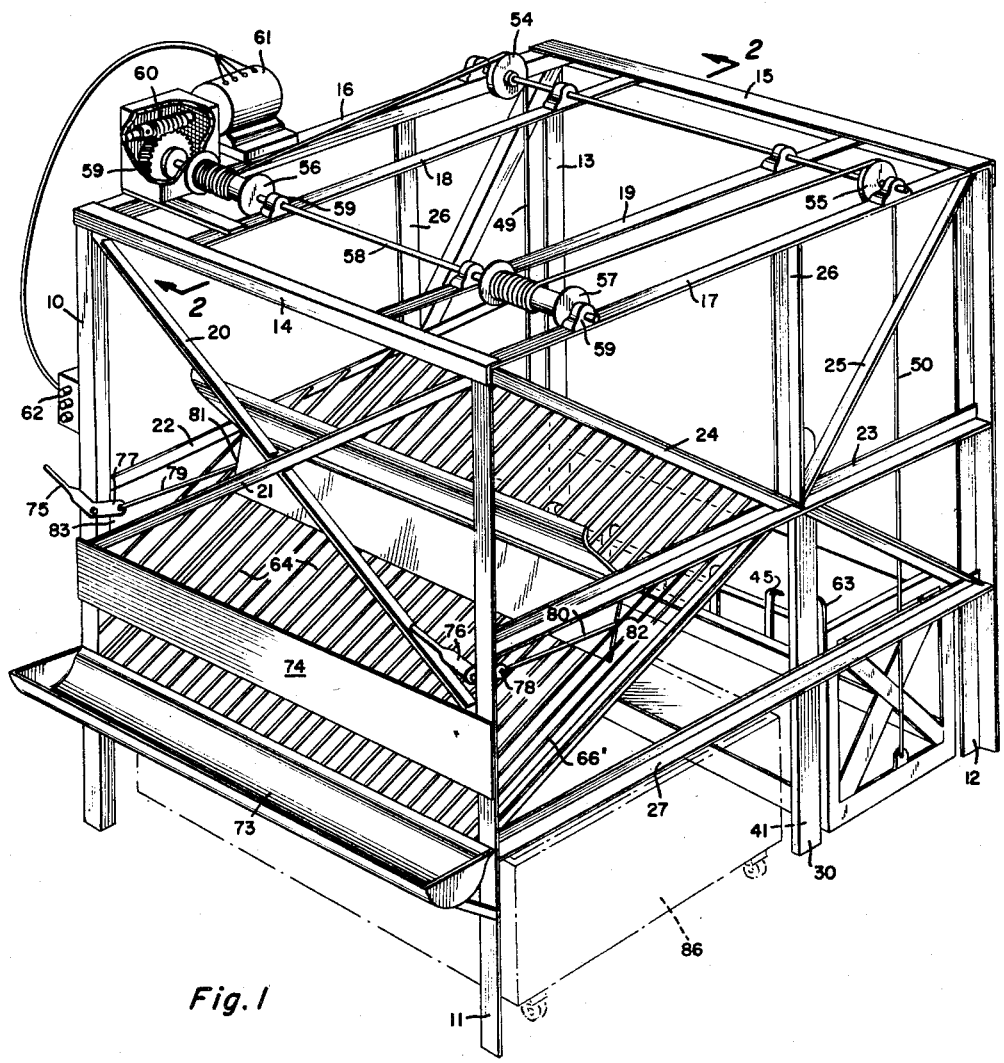
Figure 2:
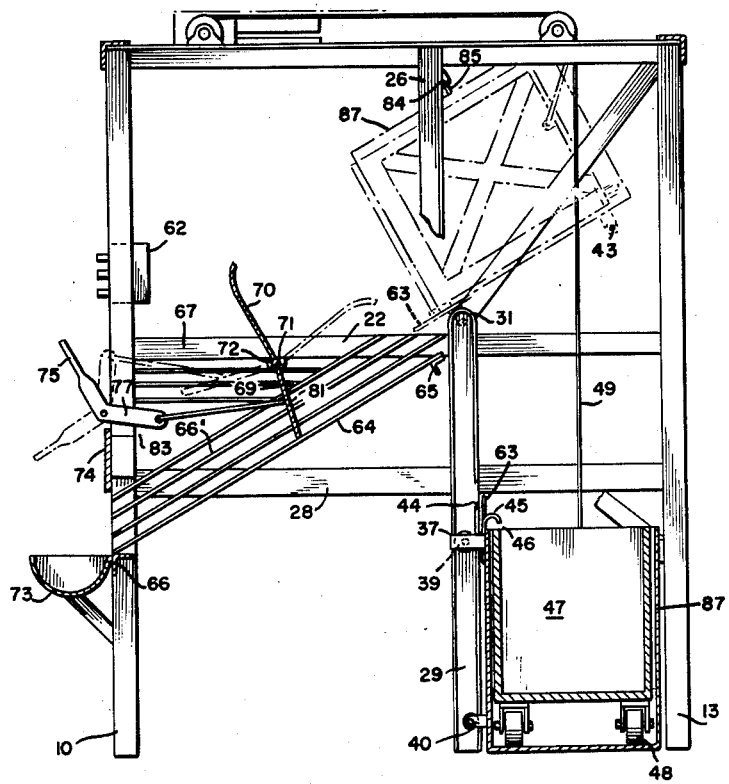
Figure 3:
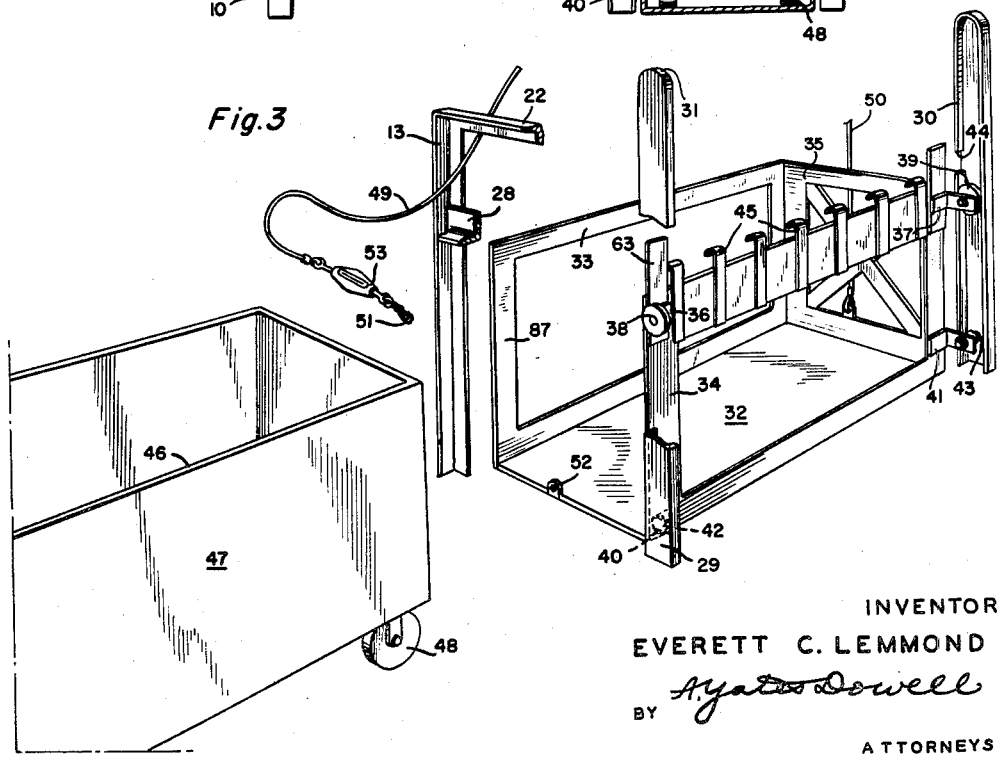

Other and further objects will be apparent as a description proceeds and upon reference to the accompanying drawings wherein:

Figure 1 is a perspective view of the apparatus showing the product lift elevator, dumping means, and separating means of the present invention;

Figure 2, a vertical section taken generally on the plane 2—2 of Figure 1 showing a wheel supported vat in the elevator ready to be lifted and showing the elevator with the vat therein in dotted lines being tipped for dumping the contents on a separating chute formed of spaced parallel bars; and Figure 3, a fragmentary perspective of the side of the product lift elevator hidden in Figure 1 and showing a vat having supporting wheels about to be run onto the elevator.

Briefly, the product lift elevator dumping and separating means of the present invention includes a suitably braced skeleton framework on which an elevator cage is mounted for vertical movement. The elevator cage is open at one end for receiving a vat supported on wheels. Suitable means are provided for guiding the elevator cage in rectilinear vertical movement for a given distance and tipping the cage and the vat therein for dumping the contents therefrom. The framework supports a plurality of downwardly inclined spaced bars providing a separating chute which permits small objects from the dumped contents to pass therethrough, while retaining large objects such as fowl thereon. A movably controlled gate is mounted in the chute to prevent the fowl from sliding therepast until the gate is opened, a trough being provided at the bottom of the chute to receive the fowl. A baffle plate mounted on the framework and spaced above the chute adjacent the bottom prevents the fowl from moving with such force as to pass beyond the trough, the frame being designed to receive suitable vats under the chute to receive the small objects and/or liquid which pass between the bars of the chute.

Referring more particularly to the drawing, the product lift elevator of the present invention includes a skeleton framework having a plurality of uprights 10, 11, 12 and 13, front and rear top members 14, 15, top side members 16, 17, and intermediate top members 18, 19 suitably secured together by welding or the like, the front being braced by suitable diagonal braces 20, 21 and the sides by horizontal stringers 22, 23, diagonal braces 24, 25 and upright braces 26, and bottom stringers 27, 28, the parts preferably being made of suitable metal angle members welded together in a well-known manner.

The stringer 28 extending between uprights 10 and 13 is located somewhat higher than stringer 27 to permit the passage of wheeled vats therebeneath. A pair of opposed upstanding channel track members 29 and 30 are fixedly secured to the framework by welding or the like, the upper ends of the channels being closed by semi-cylindrical flanges 31, 31.

An open top elevator cage including a floor 32, a rear wall 33 and a forward wall 34 and one end wall 35 is positioned between the channels 29 and 30 and the uprights 12 and 13, the front wall 34 of the elevator cage having a pair of forwardly extending lugs 36, 37 adjacent the tops on which guide rollers 38 and 39 are rotatably mounted. A pair of outwardly extending bottom lugs 40 and 41 carrying rollers 42 and 43 received in the channels 29 and 30 guide the lower portion of the elevator cage. The rollers 42 and 43 are of smaller dimension than rollers 38, 39 and adapted to pass through small recesses 44 in the near flanges of the channel adjacent the elevator cage, the rollers 38 and 39 being of large size adapted to snugly fit the channels and of sufficient size to pass over the recess 44 without passing therethrough.

A plurality of hooks 45 are mounted upon the top of the front wall of the elevator cage with the hooks extending inwardly and over the open top of the cage for engaging the upper edge 46 of a wall of a vat 47 having supporting wheels 48 for rolling onto the elevator from the open end thereof as shown in Figure 3.

The elevator guided by follower rollers 38, 39, 42 and 43 for vertical movement is raised by cables 49, 50, such cables being secured to the elevator adjacent the floor thereof by any suitable means, the cable 49 being provided with a releasable hook 51 for engagement in the eye of a lug 52 and to permit the separation of hook 51 from lug 52 so that cable 49 can be pushed aside to allow the vat 47 to be moved onto and off from the elevator cage, one of the cables being provided with means to adjust its length, such as a turn buckle or the like 53 so that both cables will be of the proper length to raise both ends of the elevator cage at the same time and to maintain the elevator cage in level relation. The cables 49 and 50 pass over guide pulleys 54, 55 suitably supported on the framework and are secured to drums 56, 57 respectively fixed on a shaft 58 which is rotatably mounted on pillow bearings 59 suitably supported on top side members 16 and 17 and intermediate top members 18 and 19. A worm gear 59 fixed on shaft 58 meshes with a worm 60 driven by a reversible motor 61 controlled by a reversing and start-stop switch 62 in a well-known manner, the worm drive being of a non-reversible type to permit stoppage of the elevator in any fully raised or partially raised position without danger of the retrograde movement.

As the elevator is raised by the cables 49 and 50, the rollers 38 and 39 come into abutting relationship with the flanges 31, 31 at the top of channels 29, 30 and are stopped from further movement, guide rollers 42 and 43 at this time being in registry with the recesses 44 in the rear flanges of the channel members 29 and 30 so that further winding of the cables 49 and 50 on the drums 56 and 57 causes the elevator cage to tip about the rollers 38 and 39 until the position shown in dotted lines in Figure 2 has been reached, at which time the contents of the vat 47 will have been completely discharged, the vat 47 being prevented from sliding off of the elevator cage by the hooks 45 engaging the upper edge 46 of the vat, the rollers 38 and 39 being prevented from dropping down in the channels 29 and 30 by upstanding projections 63, 63 fixed on the elevator cage and extending over the top of the flanges 31, 31 preventing the top of the front wall of the elevator cage from dropping. After the vat has been emptied, the reverse operation of motor 61 causes the elevator to drop to its vertical position, the rollers 42 and 43 passing back through recesses 44, 44 and the elevator lowered to its initial position. The upstanding projections raise with the elevator and remain parallel to channels 29 and 30 until the topmost position is reached when the elevator is tilted and such projections engage the rounded top portion of the flanges of channels 29 and 30, such rounded top portion being above angle bar 65.

The contents of the vat 47 are dumped onto a chute formed of a plurality of bars or pipes extending downwardly from a transverse angle member 65 adjacent the top of channels 29, 30 to a transverse angle member 66 and being secured to such transverse angle members by suitable means such as welding or the like. The bars 64 being spaced apart a sufficient distance to permit pieces of crushed ice to pass therethrough while retaining poultry thereon. Suitable side bars 66' are provided to close the sides of the chute, and horizontal bars 67 are provided to additionally increase the effectiveness of the bars 66' to close the sides of the chute for guiding and retaining poultry on the chute. A fowl retaining gate including a lower section 69 and an upper section 70 is pivoted by means of a shaft or the like 71 fixed on the gate and mounted in suitable bearings 72 on the side members 22 and 23 for rocking movement from the full line position shown in Figure 2 for retaining the poultry above the gate sections 69 and 70 to the dotted-line position to permit the poultry to pass downwardly on the chute and into a trough 73 mounted at the front. A baffle 74 spaced above the trough 73 is mounted on the front uprights 10, 11 to control the poultry passing from the chute into the trough.

The gate is operated from its full line position to its dotted-line position by means of levers 75, 76 pivoted on lugs on the uprights 10 and 11 and having arms 77, 78 respectively connected to links 79 and 80 respectively which links are connected to pivots 81 and 82 at the ends of the gate section 69, suitable stops 83 being provided to limit the clockwise movement of the levers 75 and 76 so that the arms 77 and 78 can only move a short distance past the dead center position between the pivot points of levers 75 and 76 and pivots 81 and 82 respectively to thereby retain the gate in poultry-holding position as shown in full lines (Figure 2). The links 80 and the arm 77 form a toggle and when the pivots are in line a dead center position is obtained but the stops limiting movement of lever 77 retains the toggle in gate retaining position shown. The link 79 and the arm 77 of lever 75 operate in the same way. Levers 75 and 76 being operable to move the gate to the dotted line position on the other side of "dead center" and let the poultry pass thereover into the trough 73 from which trough the packers pick up the poultry and pack them in boxes or the like for freezing, transportation and storage.

To prevent damage to the cables or other equipment, a safety switch 84 may be mounted on the vertical brace 26 and connected to the stop switch 62 to stop the motor 61 to prevent damage to the cables or other equipment. The operating button or lever 85 of the switch 84 is engageable with a portion 87 of the rear wall 33 of the elevator cage when the cage is tipped as shown in dotted lines in Figure 2.

From the above description, it will be apparent that applicant has provided separation equipment in which liquids and/or solids of small size may be separated from solids of larger size and a continuous supply of articles can be made available since one vat may be dumped onto the upper portion of the chute formed by bars 64 above the gate sections 69 and 70 and retained there while another vat is made ready for dumping and as soon as the packers have removed the previously dumped articles from trough 73, the packers can operate levers 75 and 76 to open the gate and allow the large-sized article to slide down the chute through trough 73 so that the next vat may be dumped as soon as it is placed on the elevator and moved to dumping position. The equipment is accurately controlled by the electrical switching system and damage to the equipment is prevented by the safety switch 84 in the event the operator becomes careless. The liquid and small articles may drop onto the floor which may have a suitable drain or such liquid and small articles may be dropped into a vat 86 placed below the chute 64 thereby making it possible to use the ice over again if necessary and in any case to prevent splashing of the liquid and ice. The baffle 74 and guide sections 69 and 70 prevent splashing of the liquid from the vats onto the packers, thereby improving the efficiency of the packers, as well as improving their morale.

It will be obvious to those skilled in the art that various changes may be made in the invention without departing from the spirit and scope thereof and therefore the invention is not limited by that which is illustrated in the drawings and described in the specification but only as indicated in the accompanying claims.

What is claimed is:

1. A product lift elevator for dumping the contents of open top receptacles comprising a skeleton framework having a plurality of uprights, cross members, longitudinal members and diagonal bracing, a pair of opposed upright channel trackways mounted on opposite sides of said framework, an elevator cage having a bottom and a front of at least the height of the receptacles, a first pair of guide rollers, one of said first pair of rollers mounted adjacent the top at each end of the cage front and operating in the corresponding channel, a second pair of guide rollers, one of said second pair of rollers mounted adjacent the bottom at each end of said cage front and operating within said channels whereby said cage will be guided for vertical movement by said rollers in said channels, a plurality of hooks mounted adjacent the top of the front of said elevator cage with the hooks extending rearwardly and overlying the interior of said cage for receiving the edge of a receptacle being dumped, a cable secured to each end of said elevator adjacent the bottom thereof, means for detaching at least one of said cables from said elevator cage, a guide pulley at the top of said frame above the point of securement of each cable and over which the adjacent cable passes, winding drums rotatably mounted on said framework, means to rotate said drums while preventing unintentional rotation whereby said elevator can be stopped in any selected position, a downwardly extending chute formed of a plurality of spaced bars extending from the upper ends of said channels downwardly and toward the front of said frame, a trough at the bottom of said chute for receiving articles sliding down said chute, a gate pivotally mounted on a horizontal axis above said bars for preventing articles sliding down said chute, means to prevent said gate from opening, means for opening said gate at a selected time, guide means at the sides of said chute for confining articles on said chute, a baffle mounted at the front of the framework to prevent splashing of liquid or articles on persons at the front of said framework, said elevator being raised and lowered for dumping an open top receptacle therein, said lower guide rollers being of smaller size than said upper guide rollers and said channels being provided with a passageway through which said lower guide rollers may pass when the upper guide rollers reach the top of the channel, means to hold the upper portion of the elevator cage front from lowering when the lower guide rollers are moved outwardly upon the elevator, first pair of rollers reaching the top of the channel whereby said elevator will be tilted thereby tilting a receptacle therein to dump the contents of the receptacle on said chute, such receptacle being retained on the tilted elevator cage by the said hooks at the top of the cage front.

2. A vat dumping system comprising a framework, a pair of opposed generally parallel trackways mounted in said framework, an elevator cage positioned between said trackways, a pair of guide means mounted on said elevator cage and cooperable with said trackways for guiding the elevator in its vertical movement, cable means fixed to the bottom of said elevator for raising the same, means to draw said cables to raise said elevator, stop means at the upper ends of said trackways for engaging said guide means when said elevator has been raised a predetermined amount whereby further drawing on said cables causes said elevator to be tipped and the contents dumped therefrom, a chute extending downwardly at an angle from the upper portions of said channels on which the contents of the elevator are dropped, said chute including a plurality of downwardly extending spaced bars for separating large articles from small articles and liquid, gate means mounted on the framework to prevent the dumped contents from passage therebeyond and means to control the gate whereby a continuous supply of articles may be maintained at the lower portion of said chute by the intermittent operation of said elevator.

3. Equipment for separating poultry from ice and liquid comprising a framework, vertically extending trackways mounted in said framework, an elevator mounted for vertical movement in said trackways, means on said elevator for retaining a vat of poultry, ice and liquid, means to raise the elevator and a vat thereon and dump said vat, downwardly extending spaced bars mounted on said framework with the upper ends thereof adjacent the upper limit of movement of said elevator whereby the contents of said vat may be deposited on said inclined bars, means to retain the dumped poultry on said bars between the upper and lower ends thereof, and means to release said retaining means whereby the poultry will slide to the bottom of said spaced bars and the ice and liquid will pass through the spaces between said bars.

4. The invention according to claim 3 in which the trackways are of straight channel shape closed at their upper ends and the elevator is provided with follower means for engagement in said channel trackways and engagement with the closed ends of said trackways, said elevator being provided with extensions adapted to rest on the top of the closed ends of the trackways to prevent the adjacent portion of the elevator from dropping downwardly during the dumping process.

5. A product lift and dumping elevator comprising a rectangular frame having an upright at each corner thereof, a pair of upright guide channels closed at their upper ends and located between the front and rear upright on each side of the frame, a four sided elevator cage mounted between the intermediate and rear uprights, each front side edge of said cage having rollers for engaging in the cooperating channel and having upstanding projections spaced outside of and rearwardly of said channels for engaging the upper closed ends of the channels in the dumping operation, means to raise the elevator cage by the application of force substantially below the center of gravity of the cage, an open top container in the cage, inwardly extending hooks at the front of the cage for engaging the front edge of the open top container for retaining the container in the cage during the dumping operation, a first cross member adjacent the upper end of the channel uprights, a second cross member between the front uprights below the first cross member, downwardly extending bars extending from said first cross member to said second cross member forming a grating, an article receiving trough at the front of the frame for receiving products guided by said grating, a gate mounted on said frame intermediate the upper and lower ends of said grating for retaining dumped articles on the portion of said grating, means to control the gate to permit the products thereabove to slide downwardly on the grating to said trough, said elevator being arranged to tip the cage and the open top container therein over 90° to assure dumping of the contents, means to collect liquid and small articles below said grating whereby small articles such as ice and debris will be separated from the principal large product such as chickens.

6. The invention according to claim 5 in which each front side edge of the cage has an upper roller for engaging the top of its associated channel and a lower associated roller for engaging a lower portion of its associated channel, each channel having a recess in its rear flange for the passage of the lower roller.

7. A vat dumping system comprising a framework, a pair of opposed generally parallel upstanding trackways mounted in said framework, a vat receiving elevator cage positioned between said trackways, a pair of guide means mounted on said elevator cage and cooperable with said upstanding trackways for guiding the elevator in its vertical path, cable means fixed to the bottom of the elevator spaced laterally from said trackways for raising the elevator cage, means to draw said cable means to raise said elevator cage, stop means at the upper ends of the trackways for engaging said guide means when said elevator cage has been raised a predetermined amount whereby further drawing of said cables causes said elevator to pivot about said guide means and stop means thereby dumping the contents from a vat supported in said elevator cage, hook means on the upper edge of the elevator cage adjacent said trackways and guide means for engagement with the upper edge of a vat supported in said elevator cage whereby the contents of said vat may be dumped and the vat will be retained within the said elevator cage during the dumping operation.

References Cited in the file of this patent

UNITED STATES PATENTS

| | | |
|---|---|---|
| 513,862 | Barrett | Jan. 30, 1894 |
| 875,529 | Joehnck | Dec. 31, 1907 |
| 1,200,397 | St. Clair | Oct. 3, 1916 |
| 1,458,991 | Pique | June 19, 1923 |
| 2,236,310 | Deal | Mar. 25, 1941 |
| 2,545,298 | Moule | Mar. 13, 1951 |
| 2,573,958 | Eaddy | Nov. 6, 1951 |
| 2,600,508 | Lehman | June 17, 1952 |
| 2,617,532 | Gorton | Nov. 11, 1952 |